(12) United States Patent
Fischer et al.

(10) Patent No.: US 6,622,938 B2
(45) Date of Patent: Sep. 23, 2003

(54) INJECTION STEAM GENERATOR FOR SMALL APPLIANCES

(75) Inventors: Daniel Fischer, Romansborn (CH); Mischa Stieger, Gallen (CH)

(73) Assignee: Eugster/Frismag AG, Romanshorn (CH)

(*) Notice: Subject to any disclaimer, the term of this patent is extended or adjusted under 35 U.S.C. 154(b) by 104 days.

(21) Appl. No.: 09/838,132

(22) Filed: Apr. 20, 2001

(65) Prior Publication Data

US 2001/0032599 A1 Oct. 25, 2001

(30) Foreign Application Priority Data

Apr. 22, 2000 (EP) .............................. 00108732

(51) Int. Cl.[7] ................................ B05B 9/00
(52) U.S. Cl. ................. 239/124; 239/110; 239/136; 239/533.1; 38/77.83; 38/85
(58) Field of Search ................. 239/104, 110, 239/111, 119, 120, 124, 127, 128, 135, 136, 533.1; 38/77.1, 77.5, 77.8, 77.83, 82, 84, 85

(56) References Cited

U.S. PATENT DOCUMENTS

| 3,919,793 | A | * | 11/1975 | Toft et al. .................. 38/77.83 |
| 4,614,661 | A | | 9/1986 | White et al. |
| 4,616,122 | A | * | 10/1986 | Burian et al. ................ 239/136 |
| 4,765,364 | A | | 8/1988 | Arcari |
| 5,423,485 | A | * | 6/1995 | Tagusari ..................... 239/124 |
| 6,032,391 | A | * | 3/2000 | Yao ................................ 38/85 |

FOREIGN PATENT DOCUMENTS

| DE | 29819024 U1 | 3/1999 |
| EP | 395 843 A2 | 11/1990 |

* cited by examiner

Primary Examiner—Steven J. Ganey
(74) Attorney, Agent, or Firm—Venable; Norman N. Kunitz

(57) ABSTRACT

A displaceable nozzle (8) of an injection steam generator for small appliances, particularly irons or ironing stations, comprising a steam chamber (3) inside a steam generator housing (1) provided with an injection opening (5), is positioned telescopically on a fixed member to define a nozzle chamber (10). This nozzle (8) can be displaced by an inside pressure in the nozzle chamber in a first pressure range in the direction of the injection opening (5) and can be moved back from the injection opening (5) by a restoring force e.g., a restoring spring (12), wherein the inside pressure in the nozzle chamber (10) is lower in second pressure range than in the first pressure range. A drain passage (18) for the nozzle chamber 10 is connected via a valve arrangement (19, 21) to the fixed member (11), so that excess residual water, which exits when the nozzle (18) is moved back from the nozzle chamber (10), does not cause calcification of the nozzle opening (9) and the injection opening (5). The valve arrangement (19, 21) closes off the drain passage (18) in the first pressure range and opens it in the second pressure range.

6 Claims, 1 Drawing Sheet

INJECTION STEAM GENERATOR FOR SMALL APPLIANCES

CROSS REFERENCE TO RELATED APPLCIATION

This application claims the priority of European Patent Application No. 00 108 732.9 filed Apr. 22, 2000, which is incorporated herein by reference.

BACKGROUND OF THE INVENTION

The invention relates to an injection steam generator for small appliances, in particular irons or ironing stations.

A known or proposed injection steam generator of this type in particular consists of a thick-walled, heated, preferably cylinder-shaped and upright steam chamber with a water injection nozzle that is arranged outside of the steam chamber and can be moved back and forth perpendicular to the cylinder casing wall (German Patent 298 190 24.9 or European Patent 99 121 229.1). To satisfy the demand for steam, the water injection nozzle, in the following simply called nozzle, moves toward the steam chamber under the effect of the inside or inner pressure generated by a pump in a nozzle chamber. In its end position, the nozzle closes off an injection opening in the steam chamber, and by seating itself to form a seal such that it is pressure tight. In this nozzle position, a predetermined amount of water is sprayed through the injection opening into the heated steam chamber, from which a corresponding amount of steam is then released. After satisfying the demand for steam, the nozzle can be moved automatically back to the starting position. To prevent condensation water from forming in the area immediately surrounding the injection steam generator, particularly inside the housing where the generator is installed, a silicon tube is arranged between the nozzle and the outer steam chamber wall to catch residual steam that sprays from the injection opening when the nozzle is moved back and to guide this steam toward the outside. The nozzle penetrates the silicon tube on the nozzle side so as to be steam-tight. On the opposite side, the tube is attached with an opening to the injection opening, so as to form a steam-tight seal. The end sections of the silicon tube extend into areas adjacent to the injection steam generator, which can hold the residual steam without problems, for example, in a water supply container below the nozzle, into which the condensate formed by the residual steam can flow as well. A non-flexible tube can also be used in place of the silicon tube, which has an outer wall opening through which a cylindrical section of the nozzle can glide steam-tight back and forth.

However, none of these embodiments can prevent the release of residual water from the nozzle as a result of the shrinking volume of the nozzle chamber when the nozzle moves back after the demand for steam is satisfied. This residual water wets the nozzle and runs down into a wastewater catch basin with relatively large dimensions. During a subsequent operating cycle, the residual water leaving the nozzle also wets the hot nozzle sealing seat around the injection opening, which causes the nozzle sealing seat in the steam chamber wall to calcify after several operating cycles, so that the seal around the nozzle is no longer completely tight. Furthermore, the design freedom for an appliance with an injection steam generator of this type is limited by the forcibly low arrangement of the wastewater catch basin below the nozzle or a water supply container that is provided in its place.

Thus, it is the object of the present invention to provide an injection steam generator of the aforementioned generic type, in which no calcification of the nozzle opening, the injection opening and the surrounding nozzle sealing seat occurs, due to residual water from the nozzle chamber.

SUMMARY OF THE INVENTION

The above object generally is achieved according to the present invention by an injection steam generator for small appliances, in particular irons or ironing stations, which injection generator comprises: a steam chamber inside a steam generator housing that is provided with an injection opening; a displaceable nozzle positioned telescopically on a fixed member so as to jointly define a nozzle chamber. The nozzle can be displaced, in a first pressure range, in the direction of the injection opening by an inside pressure in the nozzle chamber and can be moved back from the injection opening by a restoring force, in particular a restoring spring, when the interior pressure in the nozzle chamber is in a second pressure range lower than the first pressure range. An arrangement is provided for discharging the residual water from the injection steam generator when the nozzle is moved back from the injection opening. This discharge arrangement includes a drain passage, connected via a valve arrangement with the fixed member and in communication with the nozzle chamber, for discharging the excessive residual water from the nozzle chamber when the nozzle is moved back, with the valve arrangement being designed such that it closes the drain passage in the first pressure range for the pressure inside the nozzle chamber and opens it in the second pressure range for the pressure inside the nozzle chamber.

As a result of the uncomplicated valve arrangement that connects the nozzle chamber to a drain passage, as well as a suitable dimensioning of the valve arrangement for an automatic control of its function in dependence on the pressure conditions occurring in the nozzle chamber, virtually none of the residual water, that must be removed owing to the shrinking volume of the nozzle when it is moved back, is released from the nozzle opening. The residual water thus cannot wet this nozzle opening as well as the sealing ring during the following operating cycle, but is released through a separate drain passage at a distance from the nozzle opening.

The drain passage can lead to a water supply container that is arranged higher than the valve chamber. As a result, an appliance having such an injection steam generator can be designed freely, without limiting the installation location for the water supply container.

The valve arrangement is dimensioned such that it is closed off without external control while the demand for steam is satisfied, provided an increased pressure exists in the valve chamber during a first pressure range. Thus, only the water to be evaporated leaves the nozzle chamber through the nozzle opening, but no water leaves through the drain passage. The effectiveness of the injection steam generator is therefore not reduced. The valve arrangement does not open until after the demand for steam is satisfied, meaning once the inside or interior pressure in the nozzle chamber drops and assumes values in a second pressure range, which is determined in particular by a restoring spring that moves the nozzle back to its starting position. Thus, the residual water is pushed out almost completely through this valve arrangement during the volume reduction in the nozzle chamber, but not through the nozzle opening, which offers a higher flow resistance.

The arrangement for removing residual water is advantageously combined with an injection steam generator embodiment having a pump with a pump discharge valve arranged on the fixed nozzle member 11. When the pump is in operation, it creates a nozzle chamber inside pressure in the first pressure range of 10–12 bar. The restoring spring is dimensioned such that when the nozzle moves back, a nozzle chamber inside pressure of 5–6 bar is generated, wherein the second pressure range is between 5–6 bar as the upper range limit and atmospheric pressure as the lower range limit. In other words: the valve arrangement closes the valve chamber in a working position determined by the pump operation and opens the valve arrangement if the pressure inside the nozzle chamber is reduced and while in the idle position.

In a first uncomplicated embodiment of the injection steam generator, a diaphragm valve is provided as the valve arrangement, in which a diaphragm forms a valve flap that is closed in the first pressure range in the nozzle chamber and is opened in the second pressure range.

Alternatively, the valve arrangement can be realized with the aid of a spring-loaded ball valve that is closed in the first pressure range counter to the spring load and is opened in the second pressure range with the aid of the spring load.

Two exemplary embodiments of the invention are accordingly described in the following with the aid of a drawing with three Figures, from which further features may follow.

DETAILED DESCRIPTION OF THE PREFERRED EMBODIMENTS

Figure 1:
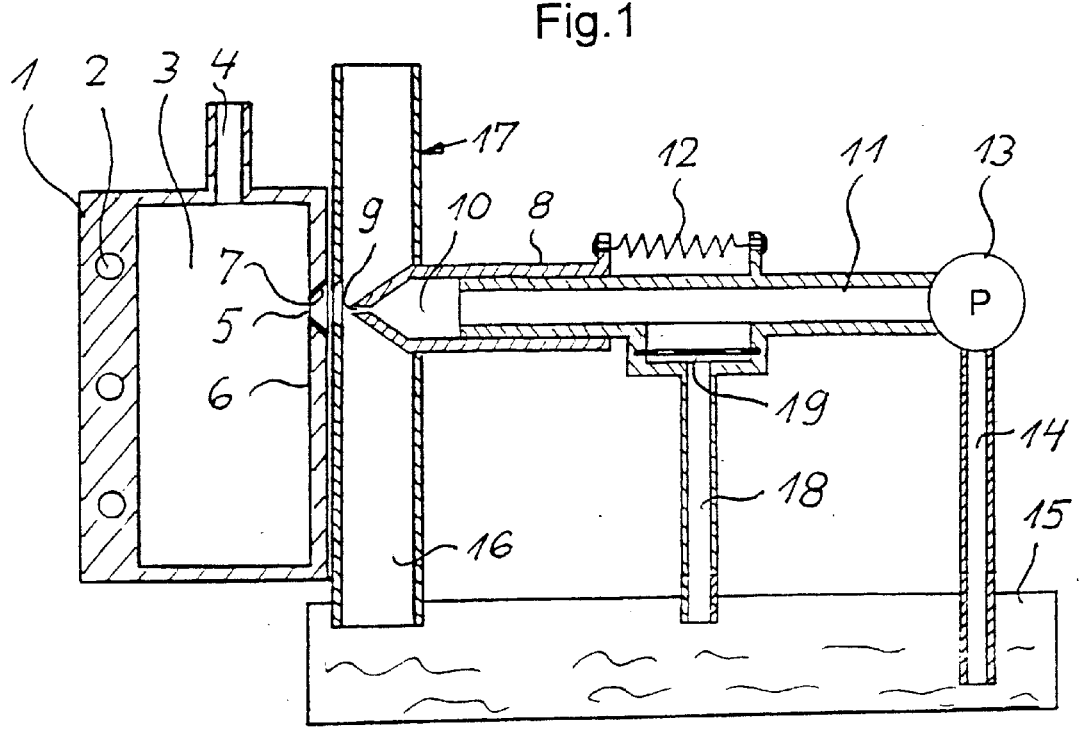
FIG. 1 is a longitudinal section through a first embodiment of the injection steam generator.

The number 1 in FIG. 1 stands for a steam generator housing with an installed heating device 2, which functions at least in part to store heat. A steam chamber 3 formed inside the steam generator housing 1 is open at a steam outlet 4 which is without a valve and from which usable steam can flow out, as well as at an injection opening 5 in a steam chamber side wall 6, which is surrounded by a nozzle sealing seat 7 as long as the injection opening is not closed off. At a right angle to a non-depicted vertical main axis for steam chamber 3, or the steam generator housing 1, a horizontally displaceable tubular nozzle 8 is arranged such that it can be horizontally pushed toward the injection opening 5 and can fit pressure-tight against the nozzle sealing seat 7. When the nozzle 8 is seated in the seal 7, a nozzle opening 9 is thus sealed off toward the outside and is connected to or in communication with the steam chamber 3. The nozzle 8 is mounted to be telescopically movable on a fixed tubular member 11 whose interior together with that of the nozzle 8 form a variable nozzle chamber 10. When idle, the nozzle 8 is positioned, with the aid of restoring spring 12 in the starting or retracted position, shown in FIG. 1 where the nozzle chamber 10 is smallest. Other devices can be used to provide the restoring force, e.g., a hydraulic piston arrangement.

The fixed member 11 is connected to a pump 13 with a pump discharge valve. The pump can suction in water from a water supply container 15 via a suction line 14. The water supply container is shown in FIG. 1 below the pump, but can alternatively be located at least partially above the pump 13. The latter positioning does not apply for the portion of the water supply container 15, into which a lower section 16 of a hose or an inflexible tube 17 extends. The nozzle 8 penetrates this tube 17 steam-tight in the direction of the tube outside. On the opposite side, the tube 17 has an opening fastened steam-tight over the injection opening 5 for draining steam that escapes from the injection opening, as well as condensate generated by this steam, wherein the condensate can flow via the lower section 16 of tube 17 into the water supply container 15.

Figure 1A:
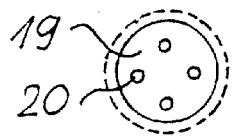
FIG. 1a is a view from above of an essential section of the residual water discharge, in particular showing a diaphragm for a diaphragm valve, serving as a valve arrangement in the drain passage.

In order not to have to drain non-evaporated residual water from the inner nozzle chamber 10 in the nozzle 8 and/or the fixed member 11 via the nozzle opening 9, the preferred injection steam generator according to FIG. 1 is provided with a drain passage 18 on the fixed member 11. The drain passage 18 is connected via a diaphragm valve 19 to the water supply container 15. The diaphragm valve 19 has valve-diaphragm openings 20 in its diaphragm, as shown in FIG. 1a, through which residual water can travel to the lower side of the diaphragm and from there into the drain passage 18, provided the diaphragm valve 19 is not closed. That is, the diaphragm has not been deflected downwardly to close the upper end of the passage 18. The diaphragm valve 19 closes if the pressure inside the nozzle chamber 10, consisting of the portion fixed in member 11 and the portion 19 the nozzle 8, builds up in a first pressure range. This pressure range is determined by the function of pump 13 if there is a demand for steam and is typically in the range of 10–12 bar. On the other hand, the relief valve 19 opens up if the aforementioned pressure inside the nozzle chamber 10 drops because the pump 13 is shut down. In that case, the pressure inside the chamber 10 is in the second pressure range that is lower than in the first pressure range, that is to say typically only 5–6 bar as a result of the effect of the restoring spring 12. This low excess pressure is sufficient to remove the residual water safely from the nozzle chamber 10 and to push it into a water supply container above the nozzle chamber 10, meaning to guide it back. The residual water amount can be considerable because the displaceable nozzle 8 can have a relatively large diameter to generate the desired sealing force on the steam generator housing.

Figure 2:
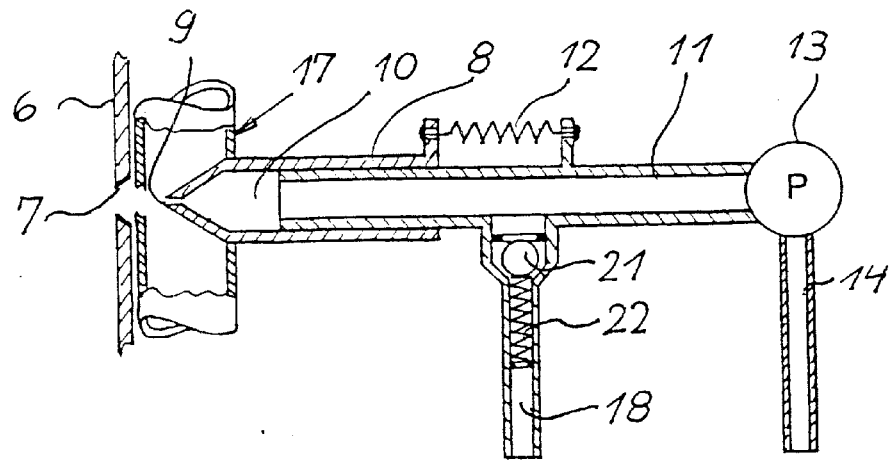
FIG. 2 is another longitudinal section of an essential portion of a second embodiment of the injection steam generator, comprising a spring-loaded ball valve as a valve arrangement.

In the second embodiment according to FIG. 2, elements that coincide are provided with the same reference numbers as in FIG. 1. This embodiment differs from the first embodiment in that the valve arrangement is a ball valve 21 that is spring-loaded by a spring 22 in the normally open position, in place of the diaphragm valve. In this case, the ball valve 21 is designed and dimensioned so as to close off the drain passage 18 if the pump 13 is running and a demand for steam exists, and to open the drain passage 18 if the displaceable nozzle 8 is brought back by the restoring spring 12 after the pump motor 13 is shut down. Accordingly, a small excess pressure will build up in the nozzle chamber 10 in both the nozzle 18 and the fixed member 11.

The invention now being fully described, it will be apparent to one of ordinary skill in the art that many changes and modifications can be made thereto without departing from the spirit or scope of the invention as set forth herein.

What is claimed is:

1. An injection steam generator for small appliances, said generator comprising a steam chamber disposed within and formed by a steam generator housing that is provided with an injection opening in a sidewall; a displaceable nozzle mounted telescopically on a fixed tubular member, to define a nozzle chamber within said nozzle and said fixed member, for displacement in a first pressure range in a direction toward the injection opening by an internal pressure in the nozzle chamber; a restoring force device for displacing the nozzle in a direction away from the injection opening when the internal pressure in the nozzle chamber is in a second pressure range that is lower than the first pressure range; and means for discharging residual water from the injection steam generator when the nozzle is displaced in a direction away from the injection opening, said means including a drain passage connected via a valve arrangement with the fixed member and in communication with the nozzle chamber for discharging the excessive residual water from the nozzle chamber when the nozzle is displaced away from the injection opening, with the valve arrangement being responsive to the pressure in the nozzle chamber to close the drain passage in the first pressure range and to open the drain passage in the second pressure range.

2. The injection steam generates according to claim 1, wherein the restoring force device is a spring connected between said nozzle and said fixed member.

3. An injection steam generator according to claim 1, wherein a pump with a pump outlet valve is mounted on the fixed member, said pump, when operating, producing an internal pressure in the nozzle chamber in the first pressure range of 10–12 bar; and the restoring device is dimensioned such that when the nozzle is displaced away from the injection opening, an internal pressure of 5–6 bar is generated in the nozzle chamber, wherein the second pressure range is disposed between 5–6 bar as the upper range limit and atmospheric pressure as the lower range limit.

4. An injection steam generator according to claim 1, wherein the valve arrangement is a diaphragm valve having a diaphragm mounted to form a valve flap that in response to the pressure in the nozzle chamber closes during the first pressure range and opens during the second pressure range.

5. An injection steam generator according to claim 1, wherein the valve arrangement is a spring-loaded ball valve that is normally in an open position by a ball and a spring acting on the ball, and that in response to the internal pressure in the nozzle chamber closes during the first pressure range counter to the load of the spring, and opens during the second pressure range as a result of the spring load.

6. An injection valve according to claim 1, wherein the drain passage leads to a water supply container that is arranged higher than the nozzle chamber.

* * * * *